(12) United States Patent
Littlejohn et al.

(10) Patent No.: US 10,569,906 B2
(45) Date of Patent: Feb. 25, 2020

(54) APPARATUS AND METHODS FOR MAKING ROTORCRAFT ROTOR BLADES

(71) Applicant: Sikorsky Aircraft Corporation, Stratford, CT (US)

(72) Inventors: David Littlejohn, Haslet, TX (US); Sven Roy Lofstrom, Irving, TX (US); Eric C. Boyle, Haslet, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 585 days.

(21) Appl. No.: 15/198,933

(22) Filed: Jun. 30, 2016

(65) Prior Publication Data

US 2018/0002038 A1    Jan. 4, 2018

(51) Int. Cl.
*B64F 5/10* (2017.01)
*B64C 27/473* (2006.01)

(52) U.S. Cl.
CPC .............. *B64F 5/10* (2017.01); *B64C 27/473* (2013.01); *B64C 2027/4736* (2013.01)

(58) Field of Classification Search
CPC .................................. B64F 5/10; B64C 27/473
See application file for complete search history.

(56) References Cited

U.S. PATENT DOCUMENTS

| | | | |
|---|---|---|---|
| 5,528,828 A * | 6/1996 | Leahy | B29C 70/446 29/889.6 |
| 5,862,576 A | 1/1999 | Leahy et al. | |
| RE37,774 E | 7/2002 | Leahy et al. | |
| 6,708,966 B1 * | 3/2004 | Troudt | B25B 5/067 269/249 |
| 2009/0169323 A1 * | 7/2009 | Livingston | F03D 1/0675 410/120 |

* cited by examiner

*Primary Examiner* — Ryan J. Walters
(74) *Attorney, Agent, or Firm* — Cantor Colburn LLP

(57) ABSTRACT

A method of making a rotor blade assembly includes receiving a sheath assembly and a blade body at a blade assembly tool. The sheath assembly is spread by applying force to an interior surface of the sheath assembly. The blade body is inserted within the interior of the sheath assembly, registered with the sheath assembly, and the force removed from the interior surface of the sheath assembly such that the sheath assembly collapses on the blade body.

7 Claims, 7 Drawing Sheets

APPARATUS AND METHODS FOR MAKING ROTORCRAFT ROTOR BLADES

BACKGROUND OF THE INVENTION

1. Field of the Invention

The present disclosure relates to manufacturing apparatus and methods, and more particularly to the fabrication, repair, and/or overhaul of helicopter rotor blades.

2. Description of Related Art

Rotorcraft, such as helicopters, commonly employ rotor blades having composite structures. Some rotor blades include a blade subassembly and a leading-edge sheath. The blade sub-assembly has an aerodynamic profile and applies the lift associated with rotation to the helicopter airframe. The leading-edge sheath provides erosion protection to the blade-assembly, improving the service life of the rotor blade and enabling rotorcraft operation in environments that could otherwise damage the blade. The blade subassembly and leading-edge sheath are typically fabricated separately and thereafter integrated to form a composite blade structure, the structure thereafter being cured to form a finished rotor blade.

One challenge forming such rotor blades is the integration of the leading-edge sheath with the blade subassembly. The leading-edge sheath in some rotor blades has a prefabricated configuration that does not allow the sheath to be inserted directly onto the blade subassembly. Instead, the trailing edges of the leading-edge sheath must be spread apart to allow the blade subassembly to be inserted within the leading-edge sheath and positioned therein, typically without contacting with the leading-edge sheath to avoid smearing the adhesive used for subsequently fixing the blade subassembly to the leading-edge sheath.

Such conventional methods and systems have generally been considered satisfactory for their intended purpose. However, there is still a need in the art for improved systems and methods of making rotor blades. The present disclosure provides a solution for this need.

SUMMARY OF THE INVENTION

A method of making a rotor blade assembly includes receiving a sheath assembly and a blade body at a blade assembly tool. The sheath assembly is spread by applying force to an interior surface of the sheath assembly. The blade body is inserted within the interior of the sheath assembly, registered with the sheath assembly, and the force removed from the sheath assembly such that the sheath assembly collapses onto the blade body.

In certain embodiments, the sheath assembly can be received at a sheath-cradling fixture. The blade body can be received at a blade-positioning fixture. Seating the rotor blade in the sheath assembly can include lowering the blade body into an interior of the sheath assembly. The sheath assembly can be spread prior to lowering the blade body into the interior of the sheath assembly.

In accordance with certain embodiments, spreading the sheath assembly can include widening a width defined between an upper airfoil surface and a lower airfoil surface of the sheath assembly. The sheath assembly can be ratchetly spread to define the width of a gap defined between an upper airfoil surface and a lower airfoil surface of the sheath assembly. The width defined between an upper airfoil surface and a lower airfoil surface of the sheath assembly can be fixed by ratchetly locking the upper surface relative to the lower surface once the sheath assembly is spread to a predetermined width.

It is also contemplated that, in accordance with certain embodiments, the method can include coupling a spreader jig to the sheath assembly. The spreader jig can be coupled to opposed interior surfaces of the sheath assembly. The spreader jig can be coupled to opposed edges of the sheath assembly adjacent to the blade body. Once the sheath assembly relaxes to engage the blade body, the spreader jig can be removed from the sheath assembly. The spreader jig can be compressed between the blade body and the sheath assembly once the sheath assembly is relaxed. The blade assembly can thereafter be removed by the blade assembly tool.

A blade assembly apparatus includes a base structure, a sheath-cradling fixture fixed relative to the base structure, and a blade-positioning fixture. The blade-positioning fixture is disposed on a side of the sheath-cradling fixture opposite the base structure and is movable relative to sheath-cradling fixture. A spreader jig is movable relative to the sheath-cradling fixture and has a plurality of pull handles that are movable between an unspread position and a spread position relative to the sheath-cradling fixture to spread the sheath assembly for seating the blade body therein.

In certain embodiments, a blade body clamping mechanism can be operably connected to the blade-positioning fixture to fix a blade body relative to the sheath-cradling fixture. A laser positioner can be fixed relative to the sheath-cradling fixture to register the blade body relative to the sheath assembly. A coarse positioning mechanism can be operably connected to the blade-positioning fixture for positioning the blade body in the sheath assembly. A fine positioning mechanism can be operably connected to the blade-positioning fixture for registering the blade body with the sheath assembly.

In accordance with certain embodiments, the spreader can include a rack with a plurality of ratchet teeth and a locking member with a locking tooth. The rack and the locking member can be movable relative to the spreader jig. The locking mechanism can be operably connected to the spreader jig to fix the width of a gap defined between an upper airfoil surface and a lower airfoil surface facing the blade-positioning fixture.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1A:
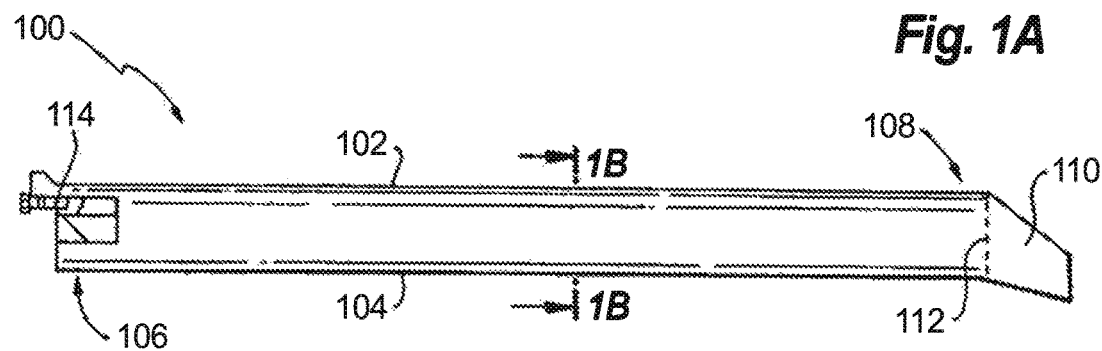
FIGS. 1A-1C are schematic views of an exemplary rotor blade assembly, showing a blade body and a sheath assembly of the rotor blade assembly.

Reference will now be made to the drawings wherein like reference numerals identify similar structural features or aspects of the subject disclosure. For purposes of explanation and illustration, and not limitation, a partial view of an exemplary embodiment of a rotor blade in accordance with the disclosure is shown in FIG. 1 and is designated generally by reference character 100. Other embodiments of rotor blades, apparatus for assembling rotor blades, and methods of making rotor blades in accordance with the disclosure, or aspects thereof, are provided in FIGS. 2-7, as will be described. The systems and methods described herein can be used for inserting blade bodies into sheaths for main rotor blade assemblies for aircraft including helicopters, however the invention is not limited to a particular type of helicopter or to aircraft in general.

Referring to FIG. 1A, a rotor blade 100 for a rotorcraft is shown. Rotor blade 100 includes a leading edge 102 and trailing edge 104. Leading edge 102 and trailing edge 104 extend spanwise along a length of rotor blade 100 between a root or inboard end 106 and an outboard end 108. An anhedral tip cap 110, illustrated in FIG. 1A as the portion of rotor blade 100 outboard of dashed line 112, is separately fabricated as a replaceable component for the main rotor blade 100, which in combination define a spanwise length of rotor blade 100. In the illustrated exemplary embodiment inboard end 106 of rotor blade 100 includes a blade cuff 114 for coupling rotor blade 100 to a rotorcraft main rotor blade assembly (not shown for reasons of clarity).

Figure 1B:
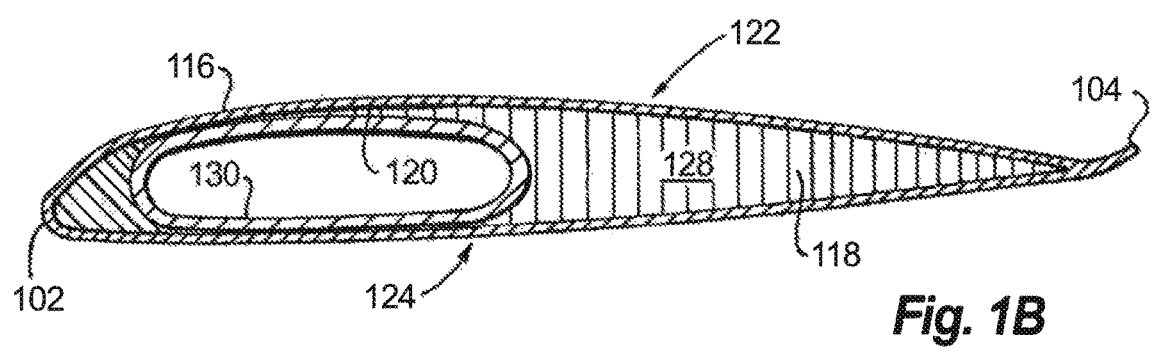

With reference to FIG. 1B, rotor blade 100 is shown in cross-section. Rotor blade 100 has a sheath assembly 116 and a blade body 118. Sheath assembly 116 is integrally coupled to blade body 118 by a compressive joint 120 that extends between blade body 118 and sheath assembly 120. Compressive joint 120 may include an adhesive, such as heat-cured resin or other composite bonding material.

Sheath assembly 116 and blade body 118 define an upper airfoil surface 122 and a lower airfoil surface 124, upper airfoil surface 122 extending between leading edge 102 and trailing edge 104 on an upper side of rotor blade 100. Lower airfoil surface 124 extends between leading edge 102 and trailing edge 104 on a lower side of rotor blade 100, upper airfoil surface 122 and lower airfoil surface 124 defining therebetween an airfoil profile 128. A spar 130 is disposed within airfoil profile 128, spar 130 providing spanwise support to rotor blade 100.

Figure 1C:
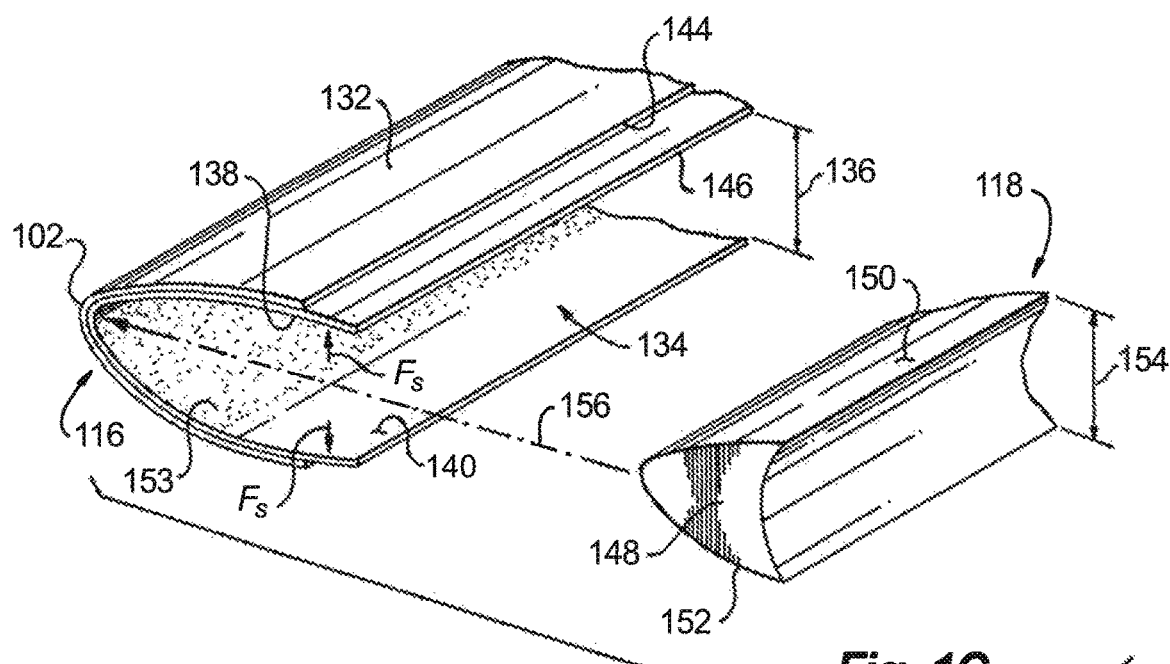

With reference to FIG. 1C, sheath assembly 116 and blade body 118 are shown. Sheath assembly 116 includes a resilient body 132 with an opening 134 defined on an end opposite leading edge 102. Opening 134 has a width 136 extending between an upper airfoil inner surface 138 and lower airfoil inner surface 140 of sheath assembly 116. Sheath assembly 116 has an unspread position I (shown in FIG. 1C) and a spread position II (shown in FIG. 5), width 136 being larger in the spread position II than the unspread position I for receiving blade body 118. Sheath assembly 116 includes an erosion resistant body with a metallic material, and in the illustrated exemplary embodiment includes both a nickel portion 144 and a titanium portion 146. Blade body 118 includes a composite structure 148 with an upper surface 150 and a lower surface 152. Upper surface 150 and lower surface 152 define between one another a width 154, which is greater than width 136 when sheath assembly 116 is in the unspread position I, and is smaller than width 154 when sheath assembly 116 is in the spread position II.

As indicated by assembly axis 156, rotor blade 100 is assembled by applying opposed spreading forces $F_S$ to inner surfaces 138 and 140, which spread (e.g., by deformation) sheath assembly 116 and widen gap 136, thereby allowing blade body 118 to be positioned within sheath assembly 116 and be registered with sheath assembly 116 without disturbing adhesive 153, which in the illustrated exemplary embodiment is distributed over portions of upper airfoil inner surface 138 and lower airfoil inner surface 140. Opposed spreading forces $F_S$ are then removed, allowing sheath assembly 116 to collapse onto blade body 118 and come into contact adhesive 153. As will be appreciated by those of skill in the art in view of the present disclosure, when collapsed (as shown in FIG. 1B), upper airfoil inner surface 138 and lower airfoil inner surface 140 exert an inwardly directed force to form compressive joint 120 (shown in FIG. 1B) including adhesive 153 between interior surfaces 138 and 140 of sheath assembly 116 and surfaces 148 and 152 of blade assembly 118. As will also be appreciated by those of skill in the art, registration of sheath assembly 116 with blade body 118 depends on the movement sheath assembly 116 as sheath assembly 116 relaxes to compressively engage blade body 118 to form joint 120.

Figure 2:
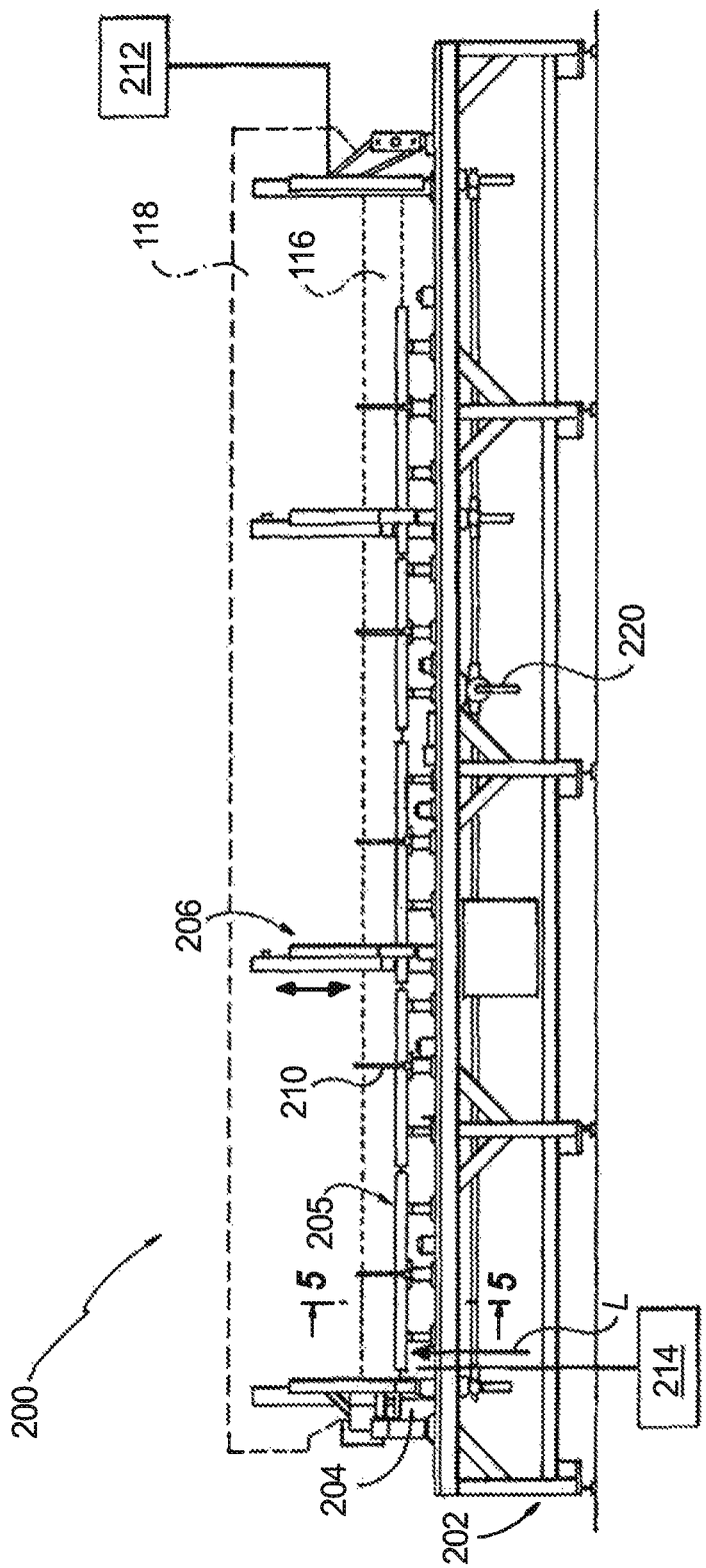
FIG. 2 is a side elevation view of a blade assembly apparatus according to an exemplary embodiment, showing a base structure, a sheath-cradling structure fixed relative to the base structure, and a blade-positioning fixture movable relative to the sheath-cradling structure.
Figure 3:
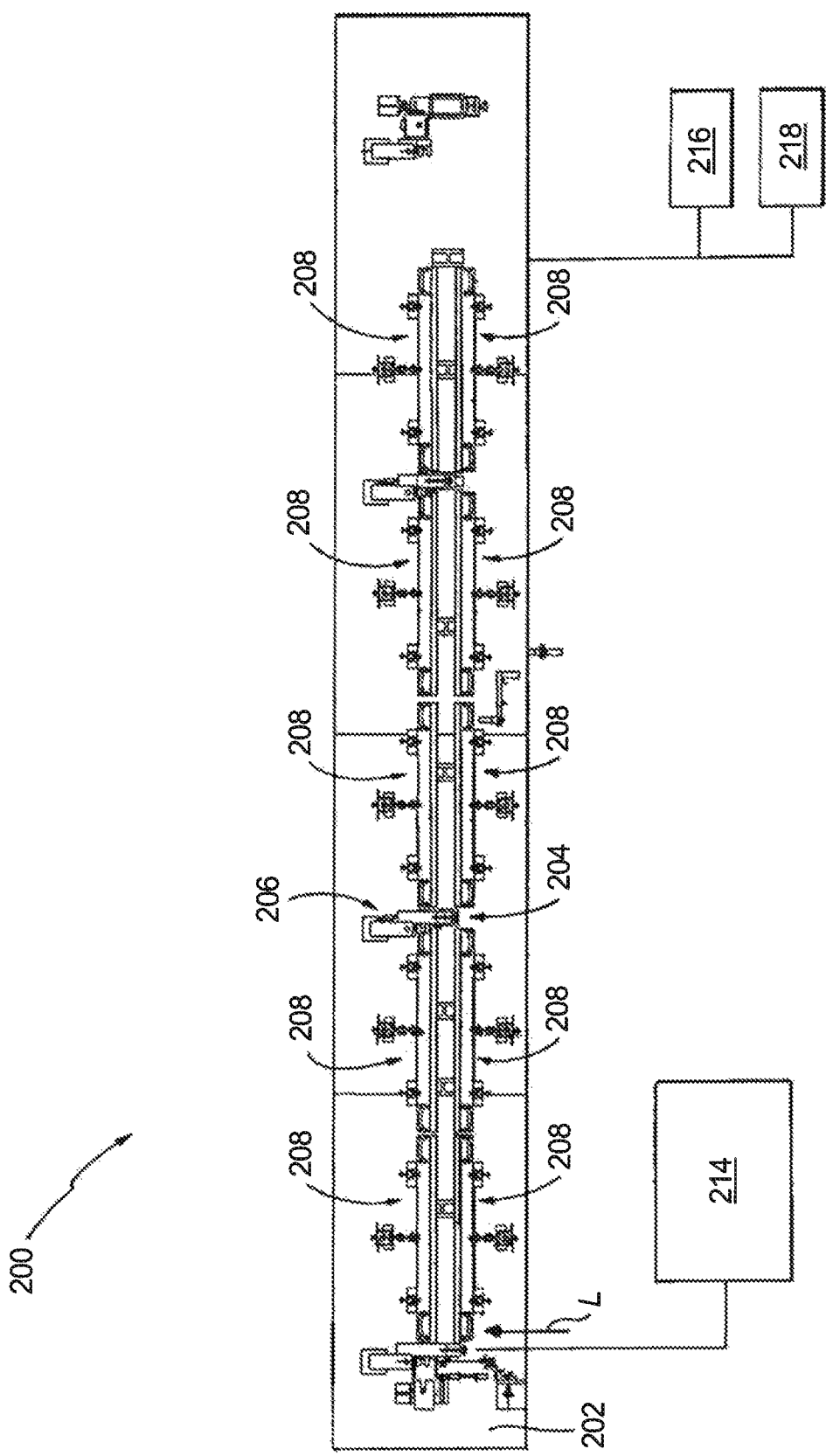
FIG. 3 is a plan view of the blade assembly apparatus of FIG. 2, showing spreader bars having spreader jigs movable relative to the sheath-cradling fixture.

Referring to FIGS. 2 and 3, a blade assembly apparatus 200 is shown. Blade assembly apparatus 200 includes a base structure 202, a sheath-cradling fixture 204, and a blade-positioning fixture 206. Sheath-cradling fixture 204 is fixed relative to the base structure 202. Blade-positioning fixture 206 is disposed on a side of sheath-cradling fixture 204 opposite the base structure 202, and in the illustrated exemplary embodiment is disposed above sheath-cradling fixture 204 relative to gravity. As will be appreciated, arranging blade-positioning fixture 206 above sheath-cradling fixture 204 allows inserting blade body 118 in sheath assembly 116 using gravity.

Blade assembly apparatus 200 includes a plurality of spreader jigs 208. Spreader jigs 208 are movable relative to the sheath-cradling fixture 204 have pull handles 210. Pull handles 210 are operatively connected to respective spreader jigs 208 to removably engage sheath assembly 116, apply spreading force $F_S$ (shown in FIG. 5) thereto, and move sheath assembly 116 between unspread position I (shown in FIG. 5) and spread position II (shown in FIG. 5) such that blade body 118 can be positioned within the interior of sheath assembly 116.

A blade body clamping mechanism 212 is operably connected to the blade-positioning fixture 206 to fix the blade body 118 relative to the sheath assembly 116. Blade body clamping mechanism 212 allows for the blade body 118 to remain in registration with sheath assembly 116 when spreader jig 208 is unloaded, improving the precision of the placement of blade body 118 relative to sheath assembly 116.

A laser positioner 214 is fixed relative to the sheath-cradling fixture 204 to register blade body 118 relative to sheath assembly 116. In the illustrated exemplary embodiment laser positioner 214 is configured to project a visible laser beam L at an angle relative to sheath assembly 116. Laser beam L defines an absolute reference to the placement of blade body 118 relative to sheath assembly 116 relative to one another and blade-positioning fixture 206, thereby allowing precise registration of blade body 118 relative to sheath assembly 116. This potentially reduces rework that could otherwise be associated with spanwise positional error of the blade body 118 relative to the sheath assembly 116. For example, blade body 118 can be positioned relative to a relaxed position of sheath assembly 116, indicated by laser beam L, while sheath assembly 116 is in the spread position II (shown in FIG. 5).

Blade assembly apparatus 200 also includes a coarse positioning mechanism 216 and a fine positioning mechanism 218 (diagrammatically shown in FIG. 3). Coarse positioning mechanism 216 is operably connected to the blade-positioning fixture 206 for positioning blade body 118 in the interior 134 (shown in FIG. 1C) of sheath assembly 116 relatively quickly, e.g., from a location above sheath assembly 116 when supported by blade-positioning fixture 206.

Fine positioning mechanism 218 is operably connected to blade-positioning fixture 206 for precisely registering blade body 118 within interior 134 of sheath assembly 116. In the illustrated exemplary embodiment, fine positioning mechanism 218 includes hand crank 220 (shown in FIG. 2), which is connected through linkages such that a single operator can lower blade body 118 into sheath assembly 116 from a longitudinally central position of blade assembly tool 200.

As illustrated in FIG. 3, a plurality, e.g., four or more, spreader jigs 208 are arranged spanwise along sheath-cradling fixture 204 to engage inner surface 138 (shown in FIG. 1C) of sheath assembly 116 (shown in FIG. 1C), and four spreader jigs 208 are arranged spanwise along sheath-cradling fixture 204 to engage inner surface 138 (shown in FIG. 1C) of sheath assembly 116. In the illustrated exemplary, four spreader jigs 208 arranged serially along opposite sides of sheath assembly 116 to be progressively spread in a spanwise direction by successive operation of the spreader jigs by a single operator, simplifying operation of blade assembly apparatus 200.

Figure 4:
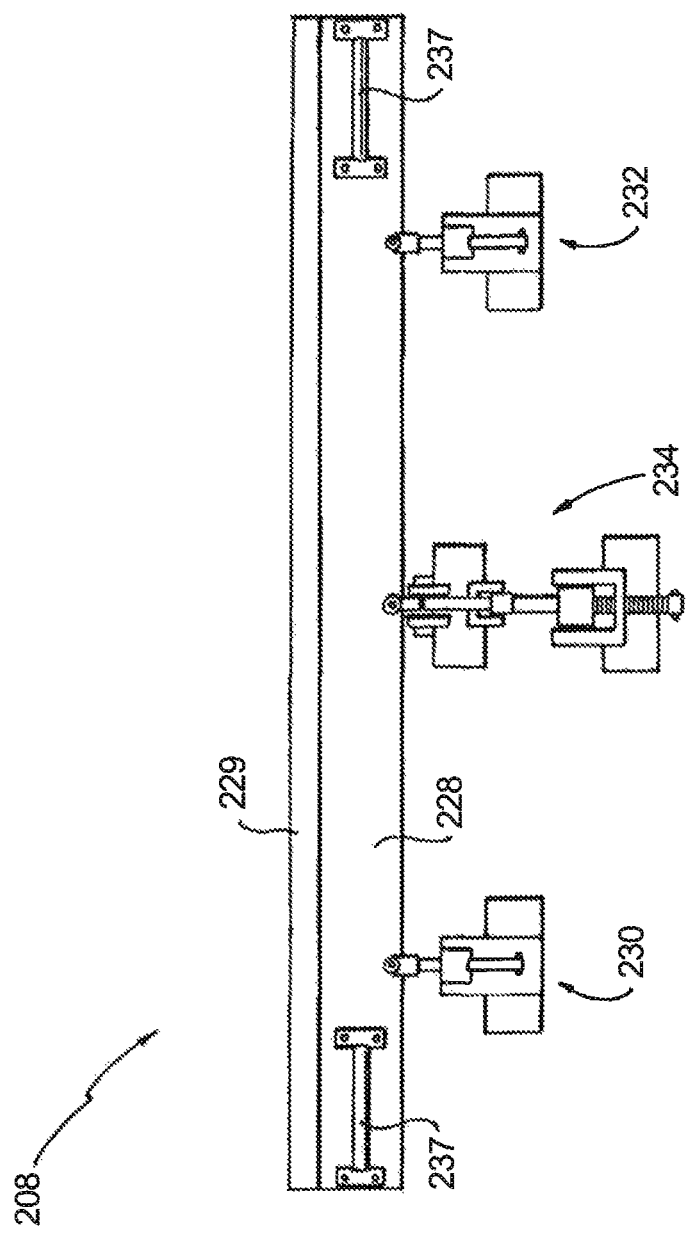
FIG. 4 is a plan view of a portion of the blade assembly apparatus of FIG. 2, showing a spreader jig of the blade assembly apparatus.

Referring to FIG. 4, spreader jig 208 is shown. Spreader jig 208 includes a spreader bar 228 with handles 237 and an engagement lip 229, an outboard support 230, an inboard support 232, and a spreader mechanism 234. Engagement lip 229 spans a segment of sheath assembly 116 corresponding to about one-quarter the length of sheath assembly, distributing spreading force $F_S$ along a length on an interior surface of sheath assembly 116. Handles 237 allow for an operator to engage and disengage spreader bar 228 from sheath assembly 116.

Outboard support 230 and inboard support 232 pivotably fix spreader bar 228 to base structure 202 (shown in FIG. 2). Spreader bar 228 extends between outboard support 230 and inboard support 232 such that spreader mechanism 234 can pivot spreader bar 228 about its length, which is substantially parallel to sheath assembly 116. This arrangement constrains spreader mechanism 234 to two degrees of freedom, the first degree of freedom being along a lateral axis orthogonal relative to sheath-cradling fixture 204 (shown in FIG. 2), the second degree of freedom being along a vertical axis (relative to gravity) orthogonal relative to sheath-cradling fixture 204. Pull handles 237, shown in FIG. 4, arranged on spanwise opposite sends of spreader bar 238 allow a single operator to manually position engagement lip 229 within the interior 134 (shown in FIG. 1C) of sheath assembly 116 by manipulating spreader bar 228.

Figure 5:
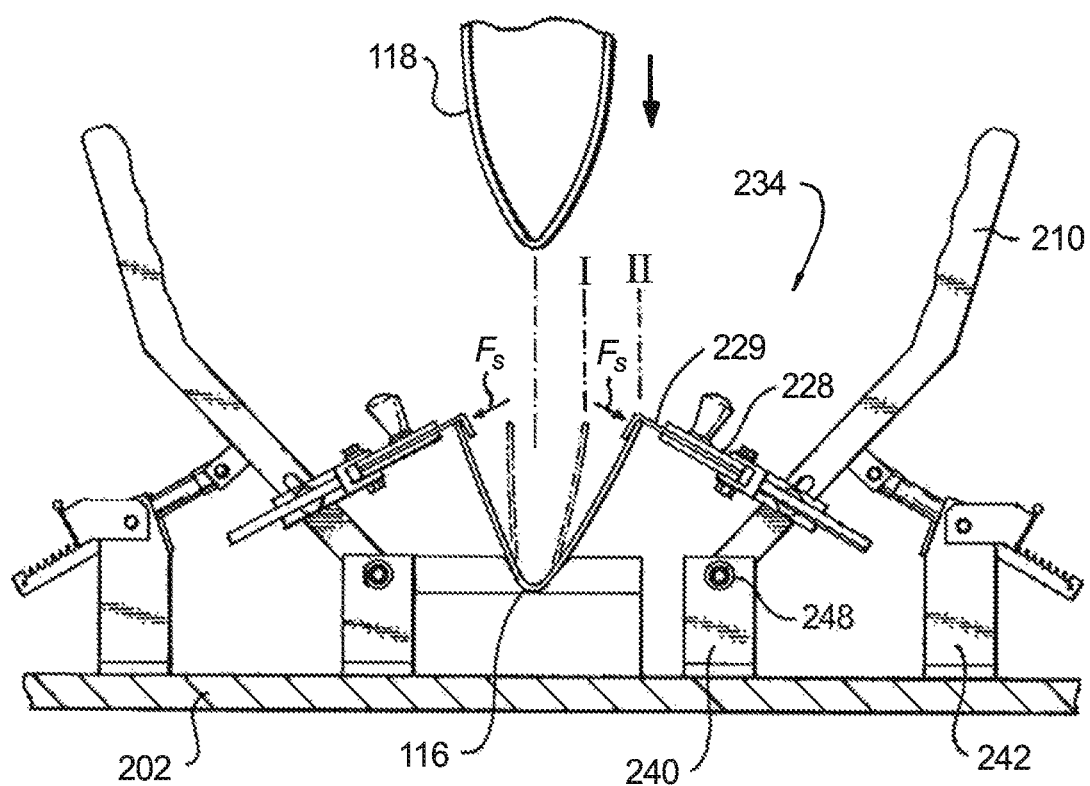
FIG. 5 is a cross-section end view of the spreader jig of the blade assembly apparatus, showing pull handles of opposed spreader jigs spreading the sheath assembly to receive the blade body within the sheath assembly.
Figure 6:
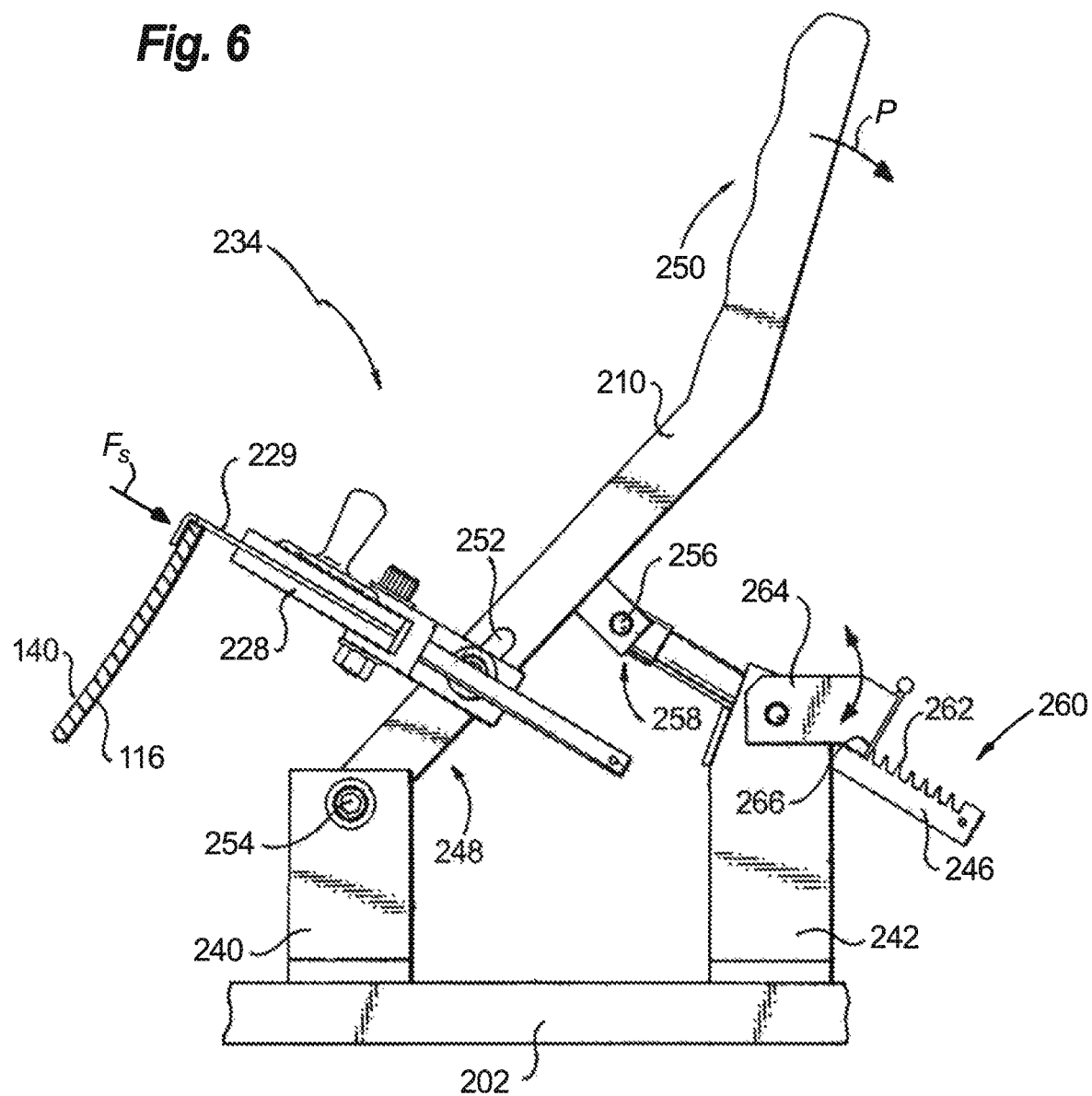
FIG. 6 is an end view of the pull and handle and spreader jig of FIG. 5, showing the rack with ratchet teeth and locking tooth for fixing the width of the sheath assembly once spread.

Referring to FIGS. 5 and 6, spreader mechanism 234 is shown. Spreader mechanism 234 includes a first bracket 240, a second bracket 242, a pull handle 210, and a rack 246. First bracket 240, second bracket 242, and pull handle 210 are each disposed on a common side of sheath assembly 116. First bracket 240 is fixed to base 202 adjacent to sheath assembly 116. Second bracket 242 is fixed to base 202 and is disposed on a side of first bracket 240 opposite sheath assembly 116.

Pull handle 210 has a pin end 248 and an opposed handle end 250. A slot 252 is defined by pull handle 210 between pin end 248 and handle end 250. Pin end 248 is pivotably fixed to first bracket 240 by a first bracket pin 254. Rack 246 is pivotably fixed to pull handle 210 by an axially offset rack pin 256, rack pin 256 being fixed to pull handle 210 at a location along a length of pull handle 210 between pin end 248 and handle end 250 of pull handle 210. A roller fixed within a clevis structure is seated within slot 252, pivotably fixing spreader bar 228 to pull handle 210.

Rack 246 has a pin end 258 and an opposed tooth end 260. Pin end 258 is pivotably fixed to pull handle 210 by rack pin 256. Tooth end 260 includes a plurality of rack teeth 262 and is slideably received by second bracket 242. A locking member 264 with a lock tooth 266 is pivotably supported by second bracket 242 such that lock tooth 266 engages rack teeth 262 when pivoted toward base 202, and disengages rack teeth 262 when pivoted toward pull handle 210.

Rack teeth 262 have tooth profiles for selectively engaging and disengaging lock tooth 266 according the application of a pull force P on pull handle 210 by an operator. In this respect, when an operator exerts pull force P on pull handle 210, pull handle 210 displaces towards second bracket 242. Displacement of pull handle 210 towards second bracket 242 exerts spreading force $F_S$ against interior surface 140 of sheath assembly 116 (through engagement lip 229). Displacement of pull handle 210 towards second bracket 242 also causes locking member 264 to ratchetly disengage and engage rack teeth 262 according to displacement of pull handle 210, the subsequent engagement thereafter locking spreader mechanism 234 according to the displacement of pull handle 210. This allows successive application of pulling force P to pull handle 210 to exert spreading force $F_S$ against interior surface 140 through spreader bar 228, progressively widening width 136, and allowing sheath assembly 116 to deform between its unspread position I and its spread position II. As will be appreciated, once positioning is complete, locking member 264 can manually be unlocked by pivoting locking member 264 upwards, thereby relaxing sheath assembly 116 such that sheath assembly 116 compressibly seats against blade body 118.

Figure 7:
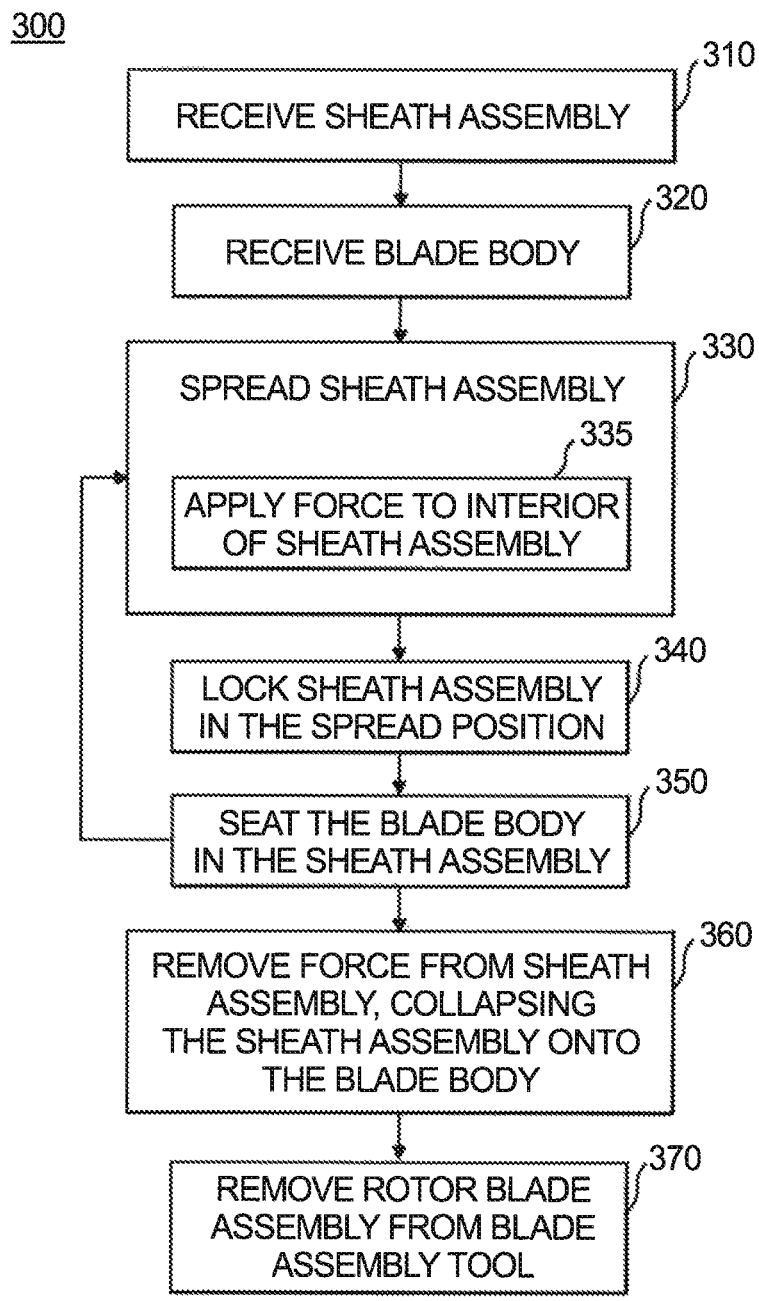
FIG. 7 is a schematic view of a method of assembling a rotor blade for a rotorcraft using the blade assembly apparatus of FIG. 2, showing steps of an exemplary assembly method.

With reference to FIG. 7, a method 300 of assembling a rotor blade, e.g., rotor blade assembly 100 (shown in FIG. 1A), is shown. Method 300 includes receiving a sheath assembly, e.g., sheath assembly 116 (shown in FIG. 1C), at a blade assembly tool, e.g., blade assembly tool 200 (shown in FIG. 2), as shown with box 310. Method 300 also includes receiving a blade body, e.g., blade body 118 (shown in FIG.

1C), at the blade assembly tool, as shown with box 320. The sheath is spread, e.g., between an unspread position I (shown in FIG. 5) and a spread position II (shown in FIG. 5), by applying force to the sheath assembly, as shown by box 330. The force can be applied to an interior surface of sheath assembly, e.g., interior surfaces 138 and 140 (shown in FIG. 1C), as shown with box 335. The blade body is then inserted within an interior of the sheath assembly, e.g., interior 134, of the sheath assembly, as shown with box 350. The blade body is then registered with the sheath assembly, as shown with arrow between box 350 and 330 (which may be an iterative process), and the force removed from the sheath assembly such that the sheath assembly collapses on the blade body, as shown with box 360.

It is contemplated that the sheath assembly be received at a sheath-cradling fixture, e.g., sheath-cradling fixture 204 (shown in FIG. 2). The blade body can be received at a blade-positioning fixture, e.g., blade-positioning fixture 206 (shown in FIG. 2). Seating the rotor blade in the sheath assembly can include lowering the blade body into an interior of the sheath assembly. The sheath assembly can be spread, e.g., deformed from unspread position I (shown in FIG. 5) to spread position II (shown in FIG. 5), prior to positioning the blade body within the interior of the sheath assembly.

Spreading the sheath assembly can include widening a width, e.g., width 136 (shown in FIG. 1C), defined between an upper airfoil surface and a lower airfoil surface of the sheath assembly. The sheath assembly can be ratchetly spread, e.g., using ratchet teeth 262 (shown in FIG. 6), and a locking tooth, e.g., using locking tooth 266 (shown in FIG. 6), to define the width defined between an upper airfoil surface and a lower airfoil surface of the sheath assembly. The width defined between an upper airfoil surface and a lower airfoil surface of the sheath assembly can be fixed by ratchetly locking the upper surface relative to the lower surface. The blade assembly can thereafter be removed by the blade assembly tool, as shown with box 370.

In embodiments described herein, a blade clamping system secures the sheath assembly to the blade assembly tool prior to lowering a blade body into the sheath assembly. In certain embodiments the laser positioner allows for precise positioning of the blade body within the sheath assembly prior to nesting the blade body in the sheath assembly. In accordance with certain embodiments, a coarse positioning mechanism and a fine positioning mechanism with a hand crank allow for nesting the blade body in the interior of the sheath assembly with a spreader fixture and locking mechanism, allowing for single operator operation of the blade assembly tool.

The methods and systems of the present disclosure, as described above and shown in the drawings, provide for rotor blade assemblies with superior properties including improved registration of the blade body with the sheath assembly of the rotor blade. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A blade assembly apparatus, comprising:
   a base structure;
   a sheath-cradling fixture fixed relative to the base structure;
   a blade-positioning fixture disposed on a side of a sheath assembly opposite the base structure and movable relative to the sheath assembly; and
   a spreader jig movable relative to the sheath-cradling fixture, wherein the spreader jig includes a plurality of pull handles movable between an unspread position and a spread position relative to the sheath-cradling fixture to spread a sheath assembly for seating a blade body therein, and wherein the spreader jig further includes a spreader bar with a lip configured to engage an inner surface of the sheath assembly.

2. The blade assembly apparatus as recited in claim 1, further comprising a blade body clamping mechanism operably connected to the blade-positioning fixture to fix the blade body relative to the sheath-cradling fixture.

3. The blade assembly apparatus as recited in claim 1, further comprising a laser positioner fixed relative to the sheath-cradling fixture to register the blade body relative to the sheath assembly.

4. The blade assembly apparatus as recited in claim 1, further comprising a coarse positioning mechanism and a fine positioning mechanism operably connected to the blade-positioning fixture to register the blade body relative to the sheath assembly.

5. The blade assembly apparatus as recited in claim 1, further comprising a locking mechanism operably connected to the spreader jig to fix a width of the sheath assembly supported by the sheath assembly cradle.

6. The blade assembly apparatus as recited in claim 5, wherein the locking mechanism includes a rack with a plurality of ratchet teeth pivotably fixed to the spreader jig and a locking member with a locking tooth pivotable relative to the rack to spread the sheath assembly and lock the sheath assembly in the spread position.

7. A blade assembly apparatus, comprising:
   a base structure;
   a sheath-cradling fixture fixed relative to the base structure;
   a blade-positioning fixture disposed on a side of a sheath assembly opposite the base structure and movable relative to the sheath assembly; and
   a spreader jig movable relative to the sheath-cradling fixture, wherein the spreader jig includes a plurality of pull handles movable between an unspread position and a spread position relative to the sheath-cradling fixture to spread a sheath assembly for seating a blade body therein, wherein the spreader jig further includes a spreader bar with a lip configured to engage an inner surface of the sheath assembly, wherein the spreader jig transforms from the unspread position to the spread position in response to application of a force thereto, a blade body being insertable into the sheath assembly when the spreader jig is in the spread position, and the spreader jig is configured to collapse onto the blade body upon removal of the force.

\* \* \* \* \*